Figure 1:
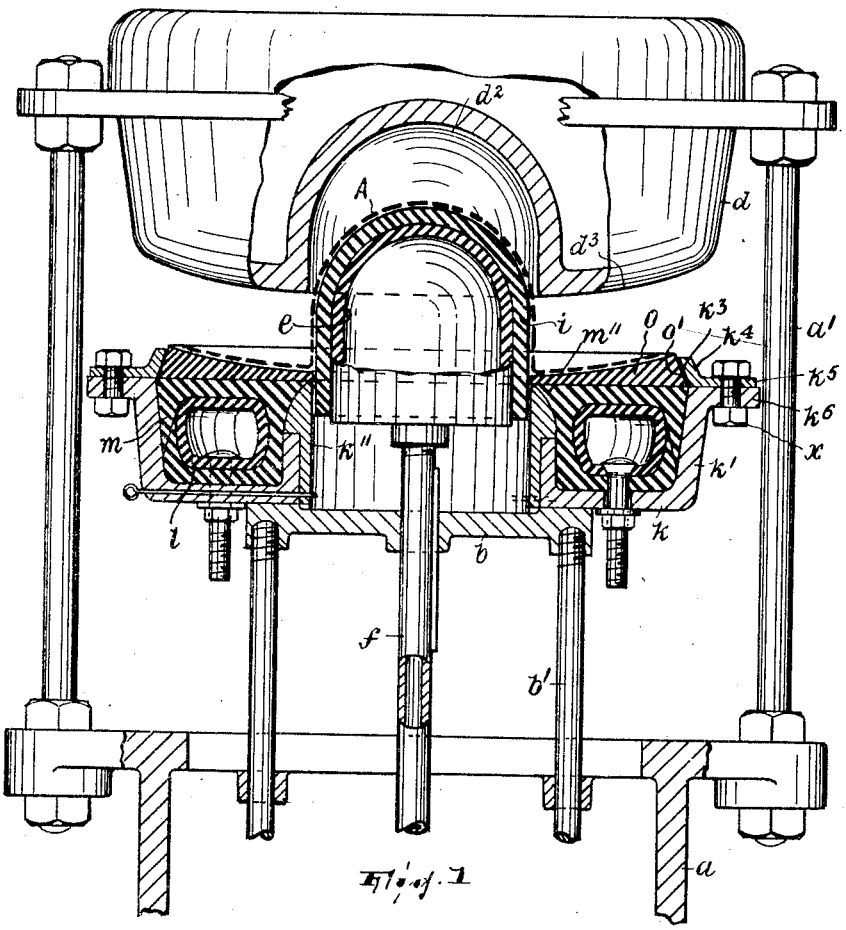

April 23, 1929.  J. LAKE, SR  1,710,226

HAT PRESSING MACHINE

Filed Nov. 16, 1927

WITNESS,
Wm L Bell

INVENTOR,
James Lake Sr.,
BY John Steward
ATTORNEY

Patented Apr. 23, 1929.

1,710,226

UNITED STATES PATENT OFFICE.

JAMES LAKE, SR., OF BROOKLYN, NEW YORK.

HAT-PRESSING MACHINE.

Application filed November 16, 1927. Serial No. 233,566.

This invention relates to hat pressing machines and consists in certain improvements in the hat pressing machine set forth in Patent No. 1,526,000 granted to me February 10, 1925, such improvements relating especially to means by which the platen or packing of such a machine is maintained at all times in proper relation to the other parts, thus to avoid injury to and reduce the wear and tear on the platen or packing and prevent its being the cause of injury to or improper functioning of the other parts.

Figure 2:
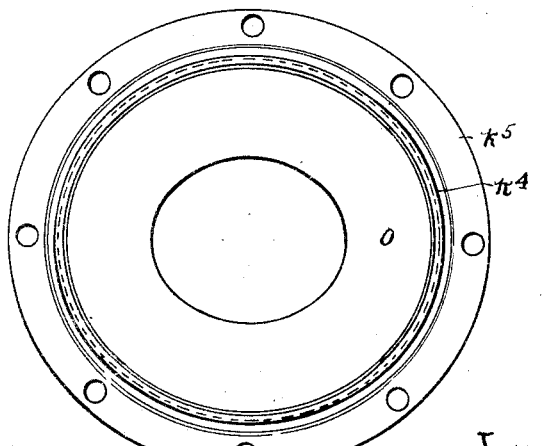

The drawing shows,

In Fig. 1 so much of a hat pressing machine embodying the present improvements as is necessary for the present disclosure, the same appearing partly in side elevation and partly in section; and In Fig. 2 a plan of the platen and a certain ring $k^4$.

The fixed structure $a$, upstanding pillars $a'$ thereof, fixed matrix or mold $d$ supported by the pillars and having the crown-shaping cavity $d^2$ and annular brim-shaping portion $d^3$, and the vertically movable structure $b$ on which is carried the channeled support $k$ for the bag means and from which depend the rods $b'$ on which, through the medium of a cross-head (not shown), is carried and vertically adjustable relatively to such support the structure including the elastic inflatable bulbous crown-shaping die $e$, having a removable cap $i$ and coactive with said cavity $d^2$, and its fluid-conducting standard $f$, are all or may be all substantially the same as in my patent aforementioned, excepting as will be hereinafter noted, as may also be with like exception the elastic rubber annular tubular body $l$ and its casing $m$, forming the bag means and arranged within the channel of said support $k$, and the endless flat yielding brim-shaping platen $o$ fitted within said channel and having an inner perimeter equal in size and conforming in shape to that of die cavity $d^2$ and overlapping, therefore, the inner flange $k''$ of support $k$ as well as the portion $m''$ of the bag means, which reaches into the crevice formed between said inner flange of the support and the inner perimeter of the platen. The broken line A in Fig. 1 indicates a hat.

The platen, when the press is open, protrudes as usual somewhat from the cavity which receives it and is formed by the inner and outer walls of support $k$ and by the bag means contained in said support.

Continual operations of the machine when constructed in accordance with my said patent resulted in the pressure on the platen expanding it outwardly, radially or in its own plane, in consequence of which the platen not only became distorted and generally unfit for further use but found itself projecting between the mold $d$ and the margin (wall $k'$) of the aforesaid platen-receiving cavity and so pinched and thus damaged by them and besides frequently, in the closing of the press, left a crevice between them so that a blow-out of the bag means followed. I have sought to overcome this defect, and this I have accomplished as follows: The outer flange or wall $k'$ of the channeled support $k$ has above the level of the top of the bag means, or, otherwise stated, around the platen-receiving cavity, its inner surface pitched inwardly, as indicated at $k^3$, thus forming an overhang; and the platen $o$ has its outer perimeter or surface $o'$ also pitched inwardly or upwardly beveled to correspond. In order to permit exchange of one platen for another of different conformation, and also of one bag means for another when occasion requires, it is of course best that that portion of the flange $k'$ which has the conical surface $k^3$ be separable from the remainder of the flange; such portion of the flange is shown as a ring $k^4$ having a lateral flange $k^5$ and secured to the flange $k^6$ of the channeled support by bolts.

In consequence of this construction it is found in practice that there is no tendency under the pressure of the co-acting pressure structures for the perimeter portion of the platen or any part of such portion to project itself between the margin of its cavity and the matrix or mold $d$; the platen therefore does not in use as readily become radially outwardly distorted or, as an incident of such distortion, become jammed or pinched as explained between and by such margin and mold or cause the existence of any crevice between them which would permit a blow-out of the bag means to result. This is largely due to the upwardly beveled form of the outer perimeter of the platen which, forming with the top or brim-supporting surface of the platen an obtuse angle rather than a right angle or less, is not conducive to the upper portion of the perimeter expanding so as to overlap the margin of its said cavity, but rather results in any radial expansion which takes place doing so in a bulge whose peak or maximum girth is below the level of the top of such cavity. It is also of course due to the mentioned overhang tending, by receiving the contact of the beveled perimeter of the platen, to cam or crowd such perimeter downwardly, which effect is of course augmented by pitching the inner surface of the overhang to substantially correspond with the bevel.

In my mentioned patented construction and others of its class it was not practicable to superimpose a plurality of platens or equivalent packings on each other, as might be sometimes desirable, since the uppermost platen would in a few operations under radial expansion bend upward at its margin and so come to project itself on radial expansion between the mold $d$ and the margin of the platen cavity. But by the present construction it is not impracticable to superimpose the packings because the mentioned overhang acts as a lock to hold down the topmost packing and prevent it from projecting itself between the mold and said margin of the platen-cavity.

Having thus fully described my invention, what I claim is:

1. In combination, with the opposing pressure-exerting structures of a hat pressing machine, one having a platen-receiving cavity and the other a mold opposed to and overhanging the margin of the cavity, a yielding brim-supporting platen arranged in and protruding from the cavity and having its perimeter beveled at an angle obtuse to its brim-supporting surface.

2. In combination, with the opposing pressure-exerting structures of a hat pressing machine, one having a platen-receiving cavity and the other a mold opposed to and overhanging the margin of the cavity, a yielding brim-supporting platen arranged in and protruding from the cavity and having its perimeter beveled at an angle obtuse to its brim-supporting surface, the first structure having an overhang arranged to receive the contact of the beveled perimeter of the platen on expansion of the latter in its own plane.

3. In combination, with the opposing pressure-exerting structures of a hat pressing machine, one having a platen-receiving cavity and the other a mold opposed to and overhanging the margin of the cavity, a yielding brim-supporting platen arranged in and protruding from the cavity and having its perimeter beveled at an angle obtuse to its brim-supporting surface, the first structure having an overhang arranged to receive the contact of the beveled perimeter of the platen on expansion of the latter in its own plane and also having the surface of said overhanging with which the platen perimeter so contacts pitched at substantially the same angle as the bevel of such perimeter.

In testimony whereof I affix my signature.

JAMES LAKE, Sr.